United States Patent [19]

Kitahara et al.

[11] Patent Number: 5,082,880
[45] Date of Patent: Jan. 21, 1992

[54] SEMICONDUCTOR SEALING COMPOSITION CONTAINING EPOXY RESIN AND POLYMALEIMIDE

[75] Inventors: Mikio Kitahara; Koichi Machida; Takayuki Kubo; Motoyuki Torikai; Koutarou Asahina, all of Kanagawa, Japan

[73] Assignee: Mitsui Toatsu Chemicals, Inc., Tokyo, Japan

[21] Appl. No.: 404,575

[22] Filed: Sep. 8, 1989

[30] Foreign Application Priority Data

Sep. 12, 1988 [JP] Japan .................................. 63-226481
Dec. 28, 1988 [JP] Japan .................................. 63-329086
Dec. 28, 1988 [JP] Japan .................................. 63-329087
Dec. 28, 1988 [JP] Japan .................................. 63-329088

[51] Int. Cl.$^5$ ........................ C08L 63/00; C08L 79/08
[52] U.S. Cl. .................................. 523/466; 525/488; 525/530
[58] Field of Search ................. 523/466; 525/530, 488

[56] References Cited

U.S. PATENT DOCUMENTS

| 4,707,529 | 11/1987 | Hoffman et al. | 525/476 |
| 4,816,531 | 3/1989 | Young | 525/502 |
| 4,946,734 | 8/1990 | Sugawara et al. | 524/96 |
| 4,957,994 | 9/1990 | Urakami et al. | 525/510 |
| 4,959,443 | 9/1990 | Yamaya et al. | 528/322 |

FOREIGN PATENT DOCUMENTS 521638 4/1982 Australia .

WO89/07627 8/1989 World Int. Prop. O. .

OTHER PUBLICATIONS

Derwent File Supplier, Japanese Patent Office, JP-A-63 230 728, Mar. 20, 1987.
Derwent File Supplier, Japanese Patent Office, JP-A-01 045 426, Feb. 17, 1989.

Primary Examiner—John C. Bleutge
Assistant Examiner—Robert E. L. Sellers, II
Attorney, Agent, or Firm—Burns, Doane, Swecker & Mathis

[57] ABSTRACT

A resin composition for sealing semiconductors which comprises (a) an epoxy resin having a specific structure, a modified epoxy resin composed of (i) an epoxy resin having a specific structure or a graft polymer of an epoxy resin having a specific structure and a vinyl polymer and (ii) a silicone polymer in an oily state or as particles having an average particle size of not more than 1.0 micron, which are uniformly dispersed in the epoxy resin or the graft polymer, (b) a hardening agent (c) an inorganic filler and (d) a special polymaleimide is herein provided. The resin composition for sealing semiconductors exhibits a low thermal expansion coefficient and a low elastic modulus, generates low stress when thermal shock is applied thereto and exhibits high heat resistance during soldering even after moisture absorption. Therefore, if the composition is used to seal large-scale semiconductor devices having high degree of integration or small-sized, this semiconductors such as flat packages, there semiconductors provide high reliability.

22 Claims, No Drawings

SEMICONDUCTOR SEALING COMPOSITION CONTAINING EPOXY RESIN AND POLYMALEIMIDE

BACKGROUND OF THE INVENTION

1. Field of the Invention

The present invention relates to a resin composition for sealing semiconductor elements or devices (hereinafter simply referred to as "semiconductor(s)"). The resin composition has a low elastic modulus and a low thermal expansion coefficient which does not adversely affect the heat resistance of the semiconductors, and which is excellent in thermal shock resistance and heat resistance during soldering and is therefore useful for sealing electronic parts such as semiconductors where high-reliability is required.

2. Description of the Prior Art

Recently, so-called plastic sealing methods using thermosetting resins represented by epoxy resins have been employed for sealing semiconductors. This is due to economical merits such as low price of the starting materials and ease of mass production. In particular, resins mainly used for sealing are resin compositions principally composed of polyfunctional epoxy resins, novolak type phenol resins and an inorganic filler because of their excellent heat resistance, moldability and electrical properties.

On the other hand, the degree of integration of semiconductor chips has been increased and correspondingly the chips have also been scaled up. Contrary to the scaling up of chips, there has been a tendency for the shape of the chip-containing packages to be made more compact and thinner as in the case of flat packages which is accompanied by changing to high density packaging on a substrate and surface mounting. For this reason, failures have occurred which have not been encountered with the conventional resins for sealing. More specifically, when thermal shock is applied, stress generated in the sealing resin due to the difference in the thermal expansion coefficients between the resin and the chip causes adverse phenomena such as the formation of cracks in the passivating film and cracks in the resin for sealing and a shift of aluminum wiring because of the scaling up of the chips and the reduction in thickness of the resin layer.

Moreover, since the package itself is exposed to a high temperature in a bath of solder during soldering, when surface mounting is performed, the moisture in the package is quickly evaporated. This in turn causes adverse phenomena such as the formation of cracks in the Package, thereby lowering the humidity resistance of the semiconductors and hence reduction in the reliability thereof. Accordingly, it has been desired to develop resins for sealing semiconductors which have reduced stress and excellent heat resistance during soldering even after moisture absorption.

Stress generated in the chip is expressed by the product of the elastic modulus of the resin and the difference in the thermal expansion coefficients between the resin and the chip. One method for reducing such stress is to make the thermal expansion coefficient of the resins small thereby minimizing the difference between the thermal expansion coefficient of the resin and a chip, but the difference is generally large and thus a large amount of inorganic fillers having a low thermal expansion coefficient must be incorporated into the resin to minimize such difference. A large amount of inorganic fillers has already been used practically in such a resin for sealing and, therefore, a further increase in the amount thereof would result in the deterioration of the moldability of the resulting resin composition. On the other hand, it has also been tried to use a plasticizer, a flexible epoxy resin or a phenol resin for the purpose of decreasing the elastic modulus of a resin to thus minimize the stress generated in a resin for sealing during thermal shock, but the hardened product obtained from these methods shows insufficient heat resistance.

Our Japanese Patent Un-examined Publication Nos. Sho 62-270617 and Sho 62-273222 disclose methods for reducing the stress generated in a resin composition during thermal shock while maintaining the desired heat resistance thereof, which comprise uniformly dispersing silicone polymer particles having an average particle size of not more than 1.0 micron in a graft polymer of an epoxy resin and a vinyl polymer. These methods are effective for lowering the stress, but they cannot completely solve the problem of heat resistance during soldering after moisture absorption. More specifically, cracks are formed in a package which absorbs water when it is exposed to an elevated temperature, such as those encountered with a bath of solder, which temperature is higher than the glass transition point of the sealing resin.

The inventors of the present invention have also investigated various methods for eliminating the foregoing problems such as a method for enhancing heat resistance of resins by using a special epoxy resin and a hardener or a method in which a maleimide compound is simultaneously used. These methods are effective for vapour phase soldering employed at a relatively low temperature, but the effects thereof for liquid phase soldering at a relatively high temperature of the order of 260° C. are insufficient.

SUMMARY OF THE INVENTION

Accordingly, an object of the present invention is to provide a resin composition for sealing semiconductors which satisfactorily fulfills various requirements for resins that are suitable for sealing semiconductors such as integrated circuits having a high degree of integration where high reliability is required. Such requirements are, for instance, low stress generated in the resin for sealing and applied on the semiconductors, high thermal shock resistance and heat resistance during soldering even after moisture absorption.

The inventors of the present invention have conducted various studies to develop resins for sealing, have found that the foregoing object can effectively be achieved by using an epoxy resin having a specific structure or a modified epoxy resin in combination with a special polymaleimide and thus have completed the present invention.

According to the present invention, there is provided a resin composition for sealing semiconductors which comprises, (a) an epoxy resin represented by the following general formula (I) or (II):

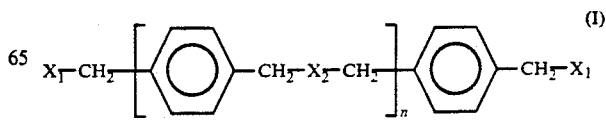

(in the formula (I), $X_1$ represents

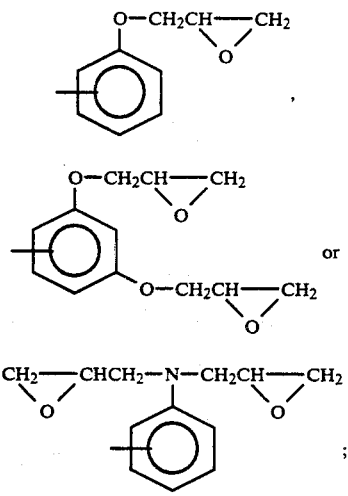

$X_2$ represents

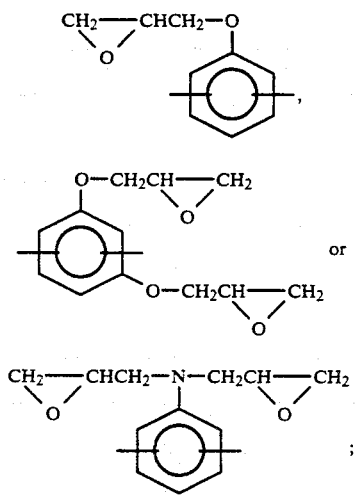

and n is an average ranging from 0 to 10);

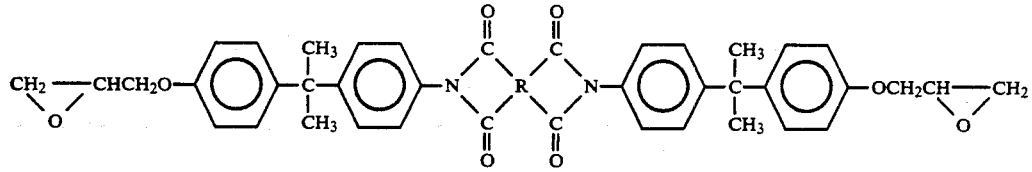

(in the formula (II), R represents a tetravalent group selected from the group consisting of aliphatic groups having at least two carbon atoms, alicyclic groups, monocyclic aromatic groups, condensed polycyclic aromatic groups and non-condensed polycyclic aromatic groups formed by connecting aromatic groups directly or through a divalent group);

(b) a hardening agent;
(c) an inorganic filler; and
(d) a polymaleimide represented by the following general formula(III)

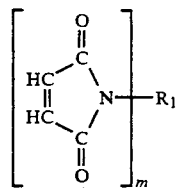

(wherein $R_1$ represents an m-valent organic group having at least two carbon atoms and m is an integer of not less than 2); and a resin composition for sealing semiconductors which comprises the same components as those listed above except that (e) a modified epoxy resin composed of an epoxy resin represented by the foregoing general formula (I) or (II) and a silicone polymer which is uniformly dispersed in the epoxy resin in an oily state or in the form of particles having an average particle size of not more than 1.0 micron or (f) a modified epoxy resin composed of (i) a graft polymer of an epoxy resin represented by the foregoing general formula (I) or (II) and a vinyl polymer and (ii) a silicone polymer which is uniformly dispersed in the graft polymer in an oily state or in the form of particles having an average particle size of not more than 1.0 micron is substituted for the epoxy resin (a) used in the foregoing resin composition.

DETAILED DESCRIPTION OF THE INVENTION

The epoxy resins represented by the formula (I) in which $X_1$ is

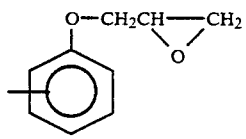

and $X_2$ is

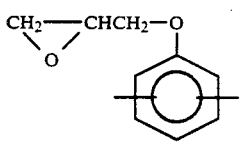

which are used in the composition of the present invention as a component (a) can be obtained by reacting phenol with dimethoxy-p-xylene in the presence of an acidic catalyst to remove methanol and then reacting the resulting product with epichlorohydrin.

The epoxy resins represented by the formula (I) in which $X_1$ is

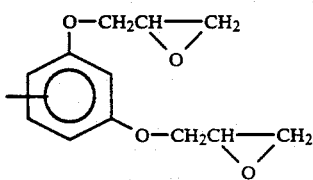

and X₂ is

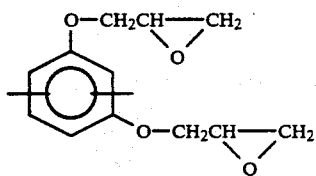

which are used in the composition of the present invention as a component (a) can be obtained by reacting resorcinol with dimethoxy-p-xylene in the presence of an acidic catalyst to remove methanol and then reacting the resulting product with epichlorohydrin.

The epoxy resins represented by the formula (I) in which $X_1$ is

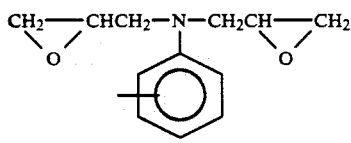

and X₂ is

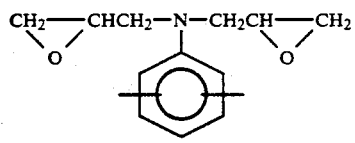

which are used in the composition of the present invention as the component (a) can be usually obtained by reacting a polyamine compound represented by the following general formula (IV) with epichlorohydrin according to a known method:

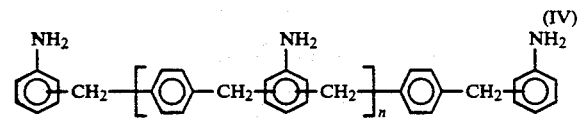

(wherein n is an average ranging from 0 to 10).

Regarding the epoxy resins represented by the formula (I), if n averages more than 10, the viscosity of the epoxy resin becomes too high to easily perform melting kneading and transfer molding operations. Since p-xylene bonds are introduced into the skeleton of the epoxy resin, it has a low rate of water absorption and an improved heat resistance.

The epoxy resins which are represented by the general formula (II) and are used in the composition of the present invention as the component (a) can be prepared by reacting a tetracarboxylic acid dianhydride represented by the following general formula (V):

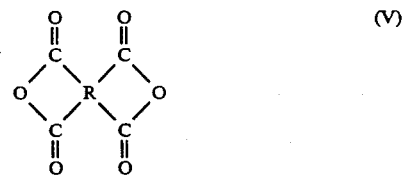

(wherein R is the same as that defined above in connection with the general formula (II)) with 2-(4-hydroxyphenyl)-2-(4'-aminophenyl)propane in an organic solvent to form an imido ring-containing phenol represented by the general formula (VI):

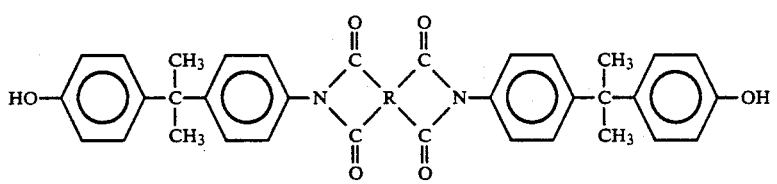

(wherein R is the same as defined above in connection with the general formula (II)), and then reacting the imido ring-containing phenol with epichlorohydrin.

Methods for preparing the imido ring-containing phenol represented by the formula (VI) are disclosed in Japanese Patent Un-examined Publication No. Sho 62-145063.

Examples of the tetracarboxylic acid dianhydrides which are represented by the general formula (V) and used as starting materials for preparing the epoxy resins represented by the formula (II) are ethylenetetracarboxylic acid dianhydride, cyclopentanecarboxylic acid dianhydride, pyromellitic acid dianhydride, 3,3',4,4'-benzophenonetetracarboxylic acid dianhydride, 2,2',3,3'-benzophenonetetracarboxylic acid dianhydride, 3,3',4,4'-biphenyltetracarboxylic acid dianhydride, 2,2',3,3'-biphenyltetracarboxylic acid dianhydride, 2,2-bis(3,4-dicarboxyphenyl) propane dianhydride, 2,2-bis(2,3-dicarboxyphenyl)propane dianhydride, bis(3,4-dicarboxyphenyl) ether dianhydride, bis(3,4-dicarboxyphenyl)sulfone dianhydride, 1,1-bis(2,3-dicarboxyphenyl)ethane dianhydride, bis(2,3-dicarboxyphenyl)methane dianhydride, bis(3,4-dicarboxyphenyl)methane dianhydride, 2,3,6,7-naphthalenetetracarboxylic acid dianhydride, 1,4,5,8-naphthalenetetracarboxylic acid dianhydride, 1,2,5,6-naphthalenetetracarboxylic acid dianhydride, 1,2,3,4-benzenetetracarboxylic acid dianhydride, 3,4,9,10-perylenetetracarboxylic acid dianhydride, 2,3,6,7-anthracenetetracarboxylic acid dianhydride and 1,2,7,8-phenanthrenetetracarboxylic acid dianhydride.

The graft polymers of an epoxy resin represented by the formula (I) or (II) and a vinyl polymer, which are used in the preparation of the component (f) in the composition of the present invention are typically prepared by polymerizing vinyl monomers in the presence of the foregoing epoxy resin to thus form the aforesaid vinyl polymer. Typical examples of vinyl monomers for obtaining the vinyl polymers include alkenyl aromatic compounds such as styrene and vinyl toluene; acrylic esters such as methyl methacrylate, dodecyl methacrylate, butoxyethyl methacrylate, glycidyl methacrylate, methyl acrylate, butyl acrylate, 2-ethylhexyl acrylate, hydroxyethyl acrylate, trimethylolpropane triacrylate; acrylic compounds free of ester groups such as acrylonitrile, acrylic acid, butoxymethyl acrylamide and methacrylamide; non-conjugated vinyl compounds such as vinyl acetate, vinyl laurate, vinyl versatate, vinyl chloride, vinylidene chloride, ethylene and allyl acetate; and conjugated diene compounds such as butadiene, isoprene and chloroprene. It is also possible to use polymerizable vinyl compounds such as vinyl silicone, dibutyl fumarate, monomethyl maleate, diethyl itaconate and fluorine-containing compounds of acrylic and methacrylic acids, for instance, trifluoroethyl methacrylate and tetrafluoropropyl methacrylate. The amount of the vinyl monomers is not restricted to a specific value, but in general ranges from 1 to 50 parts by weight per 100 parts by weight of the epoxy resin.

To obtain vinyl polymers by polymerizing the aforesaid vinyl monomers, they are generally subjected to free radical polymerization in the presence of a free radical polymerization initiator of which typical examples include a peroxide such as lauroyl peroxide, benzoyl peroxide, tert-butyl perbenzoate, dimethyl dibenzoyl peroxyhexane, tert-butyl perpivalate, di-tert-butyl peroxide, 1,1-bistert-butylperoxy-3,3,5-trimethylcyclohexane, dimethyl di-tert-butyl peroxyhexane, tert-butyl cumyl peroxide, methyl ethyl ketone peroxide, cyclohexanone peroxide, cumene hydroperoxide, tert-butylperoxy allyl carbonate, dioctylperoxy dicarbonate, tert-butyl peroxymaleate, peroxysuccinic acid, tert-butyl peroxyisopropyl carbonate and hydrogen peroxide; and an azo compound such as azobisisobutyronitrile and azobisdimethyl valeronitrile. The amount of these free radical initiators used ranges from 0.1 to 10% by weight based on the weight of the vinyl monomer.

Alternatively, these vinyl monomers ma be simultaneously subjected to a so-called redox simultaneously optionally utilizing a reducing agent. A polymerization inhibitor such as hydroquinone and a chain transfer agent such as dodecyl mercaptan may also be used in such a polymerization.

It is also effective to introduce, into the epoxy resin, chemical bonds capable of undergoing graft polymerization such as polymerizable double bonds to promote the graft polymerization. Typically, the polymerizable double bonds can be introduced into the epoxy resin, for instance, by previously reacting the epoxy resin with a compound having both a functional group and a polymerizable double bond such as acrylic acid, acrylamide, methylol acrylamide, butoxymethyl acrylamide, hydroxymethyl methacrylate, glycidyl methacrylate, maleic anhydride, monoethyl itaconate, monobutyl fumarate, chloromethyl styrene, phosphoxyethyl methacrylate, chlorohydroxypropyl methacrylate, p-hydroxystyrene and dimethylaminoethyl methacrylate. When using such a compound simultaneously having a polymerizable double bond and a functional group, the amount thereof ranges from 0.1 to 10 parts by weight per 100 parts by weight of the epoxy resin.

In the present invention, some of the foregoing epoxy resin and the vinyl polymers may remain in the foregoing graft polymer in their free state without undergoing graft polymerization.

The modified epoxy resins used herein as the component (e) or (f) may be obtained by addition-reacting a silicone polymer capable of undergoing an addition reaction according to known techniques (an addition-reacted silicone rubber) or by polymerizing a monomer capable of forming a soft vinyl-modified silicone polymer by known techniques, in the presence of the aforementioned epoxy resin (I) or (II) or the graft polymer of an epoxy resin (I) or (II) and a vinyl polymer (a soft vinyl-modified silicone polymer).

The addition-reacted silicone rubber is a rubber formed by addition-reacting a vinyl-modified silicone polymer having vinyl groups in the molecule with a hydrogen-modified silicone polymer having active hydrogen atoms in the molecule through a silylation reaction. The term "vinyl-modified silicone polymer(s)" used herein means polysiloxanes having at least one Si—CH=CH$_2$ bond at the terminal or in the middle of the molecule and the term "hydrogen-modified silicone polymer(s)" means polysiloxanes having at least two Si—H bonds at the terminal or in the middle of the molecule. They are usually available on the market in the form of combinations thereof and examples thereof are SE-1821 available from Toray Silicone Industries, Inc. and KE-1204 available from Shin-Etsu Chemical Co., Ltd.

The soft vinyl-modified silicone polymer is a polymer based on vinyl-modified silicone and has a glass transition temperature(Tg) of not higher than 20° C. The term "a polymer based on vinyl-modified silicone" used herein means a homopolymer or copolymer of vinyl-modified silicones or a copolymer of a vinyl-modified silicone and one or more of other vinyl monomers. In the present invention, any commercially available vinyl-modified silicone can be used. Examples of the vinyl-modified silicone are methacryloxypropyl siloxanes represented by the general formula:

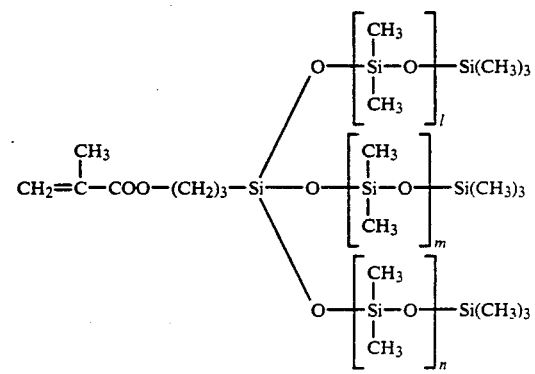

wherein, $0 \leq l$, m, n $\leq 1000$; vinyl siloxanes represented by the general formula:

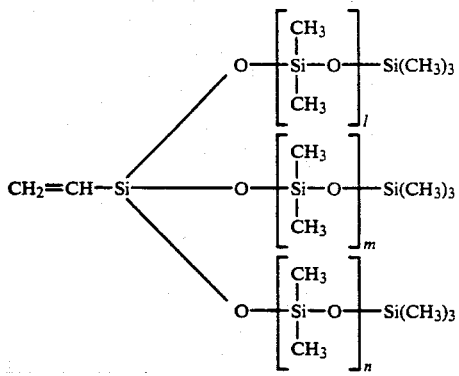

wherein, $0 \leq l$, m, $n \leq 1000$; and functional silanes represented by the general formula:

$$R^1—Si(R^2)_3$$

wherein $R^1$ represents methacryloxy, vinyl, allyl or allyloxy group and $R^2$ represents an alkyl and/or an alkoxy group.

In addition, examples of other vinyl monomers are any of the monomers listed above in connection with the formation of the graft polymers. The amount of the vinyl monomer other than vinyl-modified silicones in the copolymer is such that the resulting copolymer becomes soft or is in a liquid or rubber-like state and that the average particle size thereof is not more than 1.0 micron. The amount of vinyl monomer varies depending on the kinds of monomers used, but in general the amount thereof is not more than 80% by weight on the basis of the total weight of the monomers used for forming such a copolymer.

To achieve the intended improvement in stress and heat resistance, the average particle size of the addition-reacted silicone rubber and the soft vinyl-modified silicone polymer (hereunder referred to as silicone polymer) should be not more than 1.0 micron, preferably not more than 0.5 micron and more preferably not less than 0.01 and not more than 0.2 micron. This is because if the average particle size of the silicone polymer exceeds 1.0 micron, the intended effect of lowering the stress cannot be achieved and likewise the heat resistance is not improved. The control of the particle size of the silicone polymer may be performed by appropriately selecting the kind and amount of the vinyl polymer from which the graft polymer is prepared together with the epoxy resin; and the specific polymer or monomer composition for forming the foregoing silicone polymer as well as the number of the polymerizable double bonds to be introduced into the epoxy resin. The amount of a specific polymer or monomer used to form the foregoing silicone polymer is not limited to a specific level, but in general it ranges from 1 to 100 parts by weight per 100 parts by weight of the epoxy resin.

In the case where the resin composition of the present invention contains a modified epoxy resin (component (e) or (f)), the resin composition may optionally contain one or more of non-modified polyfunctional epoxy resins to control the amount of the silicone polymer in the total resin composition at a desired level. Examples of the non-modified polyfunctional epoxy resins are glycidylates of compounds having at least two active hydrogen atoms in a molecule, such as polyhydric phenols, e.g., bisphenol A, bishydroxydiphenyl methane, resorcinol, bishydroxydiphenyl ether, bishydroxydiphenyl sulfone, phenol novolak, cresol novolak, brominated bisphenol A and brominated phenol novolak; polyhydric alcohols, e.g., ethylene glycol, neopentyl glycol, glycerin, trimethylolpropane, pentaerythritol, diethylene glycol, polypropylene glycol, bisphenol A-ethylene oxide adduct and trishydroxyethyl isocyanurate; amino compounds, e.g., ethylenediamine, aniline and 4,4'-diaminodiphenylmethane; glycidyl type epoxy resins obtained by reacting polyvalent carboxylic compounds e.g., adipic acid, phthalic acid and isophthalic acid with epichlorohydrin or 2-methylepichlorohydrin; and aliphatic (inclusive of alicyclic) epoxy resins, e.g., dicyclopentadiene diepoxide and butadiene dimer diepoxide. Moreover, the epoxy resins represented by formula (I) or (II) may also be used as such non-modified polyfunctional epoxy resins.

In the present invention, the amount of the epoxy resin of the component (a) ranges from 5 to 65% by weight, preferably from 15 to 50% by weight on the basis of the total weight of the component (a), the component (b) and the component (d), as defined above. The amount of the modified epoxy resin of the component (e) or (f) may be easily determined by those skilled in the art on the basis of the amount of the silicone polymer required for the final resin composition for sealing semiconductors and that of the silicone polymer to be incorporated into the modified epoxy resin.

Further, the amount of the silicone polymer should be in the range of from 1 to 30% by weight and in particular 2 to 20% by weight on the basis of the sum of the amount of the component (a),(e) or (f), the non-modified epoxy resin optionally employed, the component (b) and the component (d). This is because if it is less than 1% by weight, the intended improvement in stress cannot be attained. On the other hand, if it is more than 30% by weight, not only flowability of the resin is lowered but its moldability is impaired.

To control the amount of the silicone polymer to a desired level, the amount of the vinyl monomer used in the preparation of the modified epoxy resin (f) may be adjusted, but to vary the amount of the non-modified epoxy resin makes such control easier. From such a standpoint, it is preferred to simultaneously use a non-modified epoxy resin.

In the present invention, any conventional hardening agent can be used as the component (b). Examples of the hardening agents include novolak type phenol resins obtained by reacting phenols such as phenol or an alkylphenol with formaldehyde or paraformaldehyde as well as modified novolak type phenol resins, phenol aralkyl resins, resorcinol aralkyl resins and polyhydric phenols such as trihydroxyphenylmethane and tetrahydroxyphenylethane, commonly used amine type hardening agent such as diethylenetriamine, triethylenetetramine, isophoronediamine, diaminodiphenylmethane, diaminodiphenylsulfone, m-phenylenediamine and dicyandiamide and commonly used acid anhydrides such as phthalic anhydride, hexahydrophthalic anhydride, methyl nadic anhydride, pyromellitic dianhydride and benzophenonetetracarboxylic dianhydride. The hardening agent may be used alone or in combination.

The amount of the hardening agent to be incorporated in the composition ranges from 0.1 to 10 and preferably 0.5 to 2.0 expressed in equivalent weight ratio based on the total amount of the epoxy resin (component (a)) or the modified epoxy resin (component(e) or (f))and the non-modified epoxy resin optionally used.

Examples of the inorganic fillers used herein as component (c) include powders of crystalline silica, fused silica, alumina, talc, calcium silicate, calcium carbonate, mica, clay, titanium white or the like; as well as glass fibers, carbon fibers or the like. These fillers may be employed alone or in combination, and generally crystalline silica powder or fused silica powder is used alone or in combination from the viewpoint of their properties such as thermal expansion coefficient and thermal conductivity. These silicas are amorphous or spherical. The amount thereof to be incorporated into the composition preferably ranges from 100 to 800 parts by weight per 100 parts by weight of the sum of the components (a), (e) or (f), the non-modified epoxy resin optionally used, the component (b) and the component (d). If it is less than 100 parts by weight, the thermal expansion coefficient of the resulting resin composition is extremely high and good thermal shock resistance is not attained, while if it exceeds 800 parts by weight, the resulting resin composition is not practically acceptable since the flowability thereof is lowered and hence its moldability is greatly impaired.

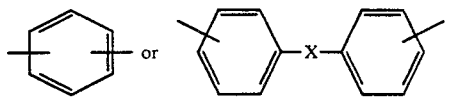

wherein X represents a single bond, a bivalent hydrocarbon group having 1 to 10 carbon atoms, a hexafluoroisopropylidene group, a carbonyl group, a thio group, a sulfinyl group, a sulfonyl group or an oxide group). Specific examples thereof include: 1,3-bis(3-maleimidophenoxy)benzene, bis(4-(3-maleimidophenoxy)phenyl)-methane, 1,1-bis(4-(3-maleimidophenoxy)phenyl)ethane, 1,2-bis(4-(3-maleimidophenoxy)phenyl)ethane, 2,2-bis(4-(3-maleimidophenoxy)phenyl)propane, 2,2-bis(4-(3-maleimidophenoxy)phenyl)butane, 2,2-bis(4-(3-maleimidophenoxy)phenyl)-1,1,1,3,3,3-hexafluoropropane, 4,4'-(3-maleimidophenoxy)biphenyl, bis(4-(3-maleimidophenoxy)phenyl)ketone, bis(4-(3-maleimidophenoxy)phenyl)sulfide, bis(4-(3-maleimidophenoxy)phenyl) sulfoxide, bis(4-(3-maleimidophenoxy)phenyl) sulfone, bis(4-(3-maleimidophenoxy)phenyl)ether and those represented by the following general formula (VIII):

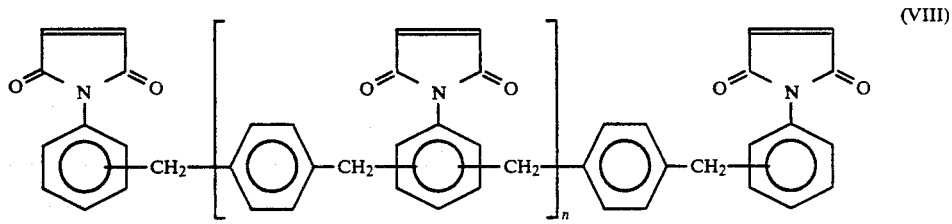

(VIII)

(wherein n is an average ranging from 0 to 10).

These polymaleimides may be used alone, in mixture thereof or in combination with other polymaleimides. The amount of the polymaleimides used ranges from 30 to 80% by weight on the basis of the total amount of the component (a), (e) or (f), component (b) and component (d).

All the compounds having at least two maleimido groups in the molecule can be used as the polymaleimides represented by the general formula (III) which are used as the component (d) in the present invention.

Examples of such polymaleimides include bismaleimide such as N,N'-ethylenebismaleimide, N,N'-hexamethylenebismaleimide, N,N'-m-phenylenebismaleimide, N,N'-p-phenylenebismaleimide, N,N'-4,4'-diphenylmethanebismaleimide, N,N'-4,4'-diphenyl ether bismaleimide, N,N'-methylenebis(3-chloro-p-phenylene)bismaleimide, N,N'-4,4'-diphenylsulfonebismaleimide, N,N',4,4'-dicyclohexylmethane bismaleimide, N,N'-4,4'-dimethylenecyclohexanebismaleimide, N,N,-m-xylenebismaleimide and N,N'-4,4'-diphenylcyclohexanebismaleimide. Preferred are bismaleimide compounds represented by the following general formula (VII):

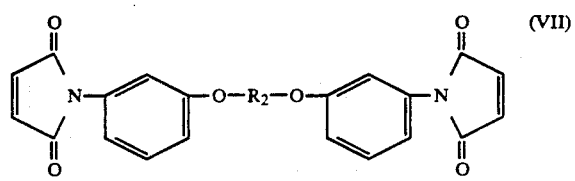

(VII)

(in the formula (VII), R₂ represents a bivalent group represented by

In the present invention, the resin composition may be prepared by, for instance, blending every component and kneading the resulting blend according to known techniques; or previously dissolving the polymaleimide component (d) in all of or a part of component (a), (e) or (f) and/or component (b); or reacting the same to form a prepolymer. In particular, the use of such a prepolymer is favorable from the viewpoint of molding properties and hardening properties of the resultant resin composition.

It is suitable in the present invention to use a curing promoter in order to harden the resin composition. The curing promoters include imidazoles such as 2-methylimidazole and 2-methyl-4-ethylimidazole; amines such as triethanolamine, triethylenediamine and tris(3,6-dioxyheptyl)amine; organic phosphines such as tributylphosphine, triphenylphosphine and tritolylphosphine; tetraphenylborates such as tetraphenylphosphonium tetraphenylborate and triethylammonium tetraphenylborate; 1,8-diazabicyclo(5,4,0)undecene-7 and derivatives thereof. The amount of these curing promoters to be used preferably ranges from 0.1 to 10 parts by weight per 100 parts by weight of the total amount of component (a), (e) or (f) component (b) and component (d).

In addition, it is also possible to simultaneously use, as optional components, organic peroxides and/or azo compounds. Examples of the organic peroxides are dialkyl peroxides such as di-t-butyl peroxide, t-butylcumyl peroxide, dicumyl peroxide, 1,3-bis(t-butylperoxyisopropyl) benzene, 1,1-di-t-butylperoxy-3,3,5-trimethyl cyclohexane and 1,1-di-t-butylperoxy cyclohexane; and alkyl peresters such as t-butyl perbenzoate. Examples of the azo compounds are azobisisobutyronitrile and azobisdimethylvaleronitrile.

The amount of these organic peroxides and/or the azocompounds preferably ranges from 0.1 to 5 parts by weight per 100 parts by weight of the polymaleimide compound.

The resin composition of the present invention may be formed into a molding material by blending the foregoing components and optionally various additives, a variety of reaction diluents, silane coupling agents, releasing agents, coloring agents and flame retardants and then mixing and kneading the resultant blend.

The resin composition according to the present invention can easily be obtained, as a material for molding, by sufficiently premixing the foregoing components, for instance, by means of a mixer, kneading the premix in a machine for melting and kneading it such as with heated rollers or a kneader, cooling the kneaded mixture to harden, and then pulverizing the hardened mixture.

The present invention will hereunder be explained in more detail with reference to the following Preparation Examples, Comparative Preparation Examples, Examples and Comparative Examples, but the invention is not restricted to these specific Examples. In the following Examples, the term "part" means "part by weight" unless otherwise specified.

PREPARATION EXAMPLE 1

100 Parts of an epoxy resin represented by the following formula (IX) (n=1.5; epoxy equivalent=223; available from Mitsui Toatsu Chemicals, Inc.):

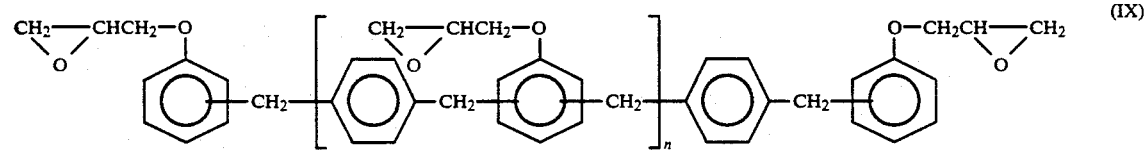

10 parts of toluene and one part of methacrylic acid were reacted at 120° to 125° C. for 2 hours in the presence of tetradecyl dimethyl benzyl ammonium chloride and then 5 parts of butyl acrylate, 10 parts of methacryloxypropylsilicone oligomer (available from Shin-Etsu Chemical Co., Ltd.), 0.4 part of azobisisovaleronitrile and 100 parts of ethyl acetate were added to the reaction product and permitted to react at 75° C. for 4 hours. Further, 15 parts of a vinyl-modified polysiloxane and 15 parts of a hydrogen-modified polysiloxane (both of these being available from Shin-Etsu Chemical Co., Ltd.; KE-1204) as addition-reacted silicone polymers were added and reacted for 2 hours with vigorous stirring. Then, the solvent was removed at 130° C. under a reduced pressure to obtain a modified epoxy resin (a-1) (epoxy equivalent=320) in which silicone rubber particles having an average particle size of 0.35 micron were dispersed.

PREPARATION EXAMPLE 2

100 Parts of the epoxy resin used in preparation example 1, 10 parts of toluene and 1 part of methacrylic acid were reacted at 120° to 125° C. for 2 hours in the presence of tetradecyl dimethyl benzyl ammonium chloride and then 3.6 parts of butyl acrylate, 0.1 part of glycidyl methacrylate and 0.05 part of t-butylperoxy-2-ethylhexanoate were added to the reaction product and permitted to react at 100 for one hour. Further, the reaction was continued by dropwise adding 30 parts of methacryloxypropylsiloxane, 0.6 part of neopentyl glycol diacrylate and 0.15 part of 1,1-bis(t-butylperoxy)-3,3,5-tricyclo hexane for 4 hours and then for an additional 4 hours. Thereafter, the solvent was removed under a reduced pressure to obtain a modified epoxy resin (a-2) (epoxy equivalent=305) in which soft vinyl polymer particles having an average particle size of 0.35 micron were dispersed.

COMPARATIVE PREPARATION EXAMPLE 1

100 Parts of ortho-cresol-novolak epoxy resin (epoxy eq.=217; EOCN-1020; available from Nippon Kayaku Co., Ltd), 10 parts of toluene and one part of methacrylic acid were reacted at a temperature of 120° to 125° C. for 2 hours in the presence of tetradecyl dimethyl benzyl ammonium chloride. To the reaction product were then added 5 parts of butyl acrylate, 10 parts of methacryloxypropyl siloxane oligomer (available from Shin-Etsu Chemical Co., Ltd.), 0.4 part of azobisisovaleronitrile and 100 parts of ethyl acetate which was allowed to react at 75° C. for an additional 4 hours. Further, 15 parts of a vinyl-modified polysiloxane and 15 parts of a hydrogen-modified polysiloxane (both of these are available from Shin-Etsu Chemical Co., Ltd.: KE-1204) as silicone polymers capable of undergoing an addition reaction were added to the reaction product and they were reacted for 2 hours with vigorous agitation. Thereafter, the product was treated at 130° C. under a reduced pressure to remove the solvents and to thus obtain a modified epoxy resin (a-3) (epoxy eq.=315) in which silicone rubber particles having an average particle size of 0.35 micron were dispersed.

COMPARATIVE PREPARATION EXAMPLE 2

100 Parts of ortho-cresol-novolak resin used in the comparative preparation example 1, 100 parts of toluene and one part of methacrylic acid were reacted at a temperature of 120° to 125° C. for 2 hours in the presence of tetradecyl dimethyl benzyl ammonium chloride and then there were added, to the resulting product, 3.6 parts of butyl acrylate, 0.1 part of glycidyl methacrylate and 0.05 part of t-butylperoxy-2-ethyl hexanoate which were permitted to react at 100° C. for one hour. The reaction was continued for 4 hours while dropwise adding 30 parts of methacryloxypropyl siloxane, 0.6 part of neopentyl glycol diacrylate and 0.15 part of 1,1-bis(t-butylperoxy)-3,3,5-tricyclohexane, followed by continuing the reaction for an additional 4 hours and removing the solvent under a reduced pressure to thus obtain a modified epoxy resin (a-4) (epoxy eq.=295) in which soft vinyl- modified silicone polymer particles having an average particle size of 0.35 micron were dispersed.

EXAMPLES 1 TO 5 AND COMPARATIVE EXAMPLES 1 TO 6

Resin compositions for molding were prepared by melting and mixing blends having compositions (part by weight) as shown in the following Table 1 for 3 minutes with rollers heated to 110° to 130° C. cooling the melt blend to harden it, pulverizing the hardened blend and compressing the pulverized resin composition.

From these compositions, 100-pin flat packages (20 mm ×30 mm×2.5 mm) provided thereon with an element (10 mm×10 mm) for testing and test pieces for determining physical properties were formed according to a transfer molding technique (molding conditions: temperature:180° C. ; pressure: 70 kg/cm$^2$; and time: 3 minutes) and then were subjected to post-hardening at 180° C. for 6 hours. The results of the tests are summarized in Table 2 given below.

TABLE 1

| Component | ex. 1 | ex. 2 | ex. 3 | ex. 4 | ex. 5 | Comp. ex. 1 | Comp. ex. 2 | Comp. ex. 3 | Comp. ex. 4 | Comp. ex. 5 | Comp. ex. 6 |
| --- | --- | --- | --- | --- | --- | --- | --- | --- | --- | --- | --- |
| Epoxy resin *1 | | | | | 7 | | | | | 2 | |
| Epoxy resin *2 | | | | | | | | | | | 7 |
| Modified epoxy resin (a-1) | 7 | 7 | 7 | | | | | | | 20 | |
| Modified epoxy resin (a-2) | | | | 7 | | | | | | | |
| Modified epoxy resin (a-3) | | | | | | 7 | 7 | 7 | | | |
| Modified epoxy resin (a-4) | | | | | | | | | 7 | | |
| Polymaleimide Compound *3 | 20 | | | 20 | 20 | 20 | | | 20 | | 20 |
| Polymaleimide Compound *4 | | 20 | | | | | 20 | | | | |
| Polymaleimide Compound *5 | | | 20 | | | | | 20 | | | |
| Phenol novolak resin *6 | 3 | 3 | 3 | 3 | 3 | 3 | 3 | 3 | 3 | 8 | 3 |
| Fused silica | 70 | 70 | 70 | 70 | 70 | 70 | 70 | 70 | 70 | 70 | 70 |
| Triphenyl phosphine | 0.25 | 0.25 | 0.25 | 0.25 | 0.25 | 0.25 | 0.25 | 0.25 | 0.25 | 0.25 | 0.25 |
| TEAK *7 | 0.6 | 0.6 | 0.6 | 0.6 | 0.6 | 0.6 | 0.6 | 0.6 | 0.6 | 0.6 | 0.6 |
| Silane coupling agent | 0.6 | 0.6 | 0.6 | 0.6 | 0.6 | 0.6 | 0.6 | 0.6 | 0.6 | 0.6 | 0.6 |
| Carnauba wax | 0.45 | 0.45 | 0.45 | 0.45 | 0.45 | 0.45 | 0.45 | 0.45 | 0.45 | 0.45 | 0.45 |
| Carbon black | 0.3 | 0.3 | 0.3 | 0.3 | 0.3 | 0.3 | 0.3 | 0.3 | 0.3 | 0.3 | 0.3 |
| Antimony Oxide | 1.5 | 1.5 | 1.5 | 1.5 | 1.5 | 1.5 | 1.5 | 1.5 | 1.5 | 1.5 | 1.5 |

*1: The epoxy resin represented by the foregoing formula (IX).
*2: o-Cresol-novolak epoxy resin (EOCN 1020, available from Nippon Kayaku Co., Ltd.)
*3: 4,4'-Bis(3-maleimidephenoxy)biphenyl (available from Mitsui Toatsu Chemicals, Inc.)
*4: Bis[4-(3-maleimidephenoxy)phenyl]sulfide (available from Mitsui Toatsu Chemicals, Inc.)
*5: Polymaleimide compound having n in the foregoing general formula (VIII) of 3.0 on the average (available from Mitsui Toatsu Chemicals, Inc.)
*6: Phenol-novolak (PN, available from Nippon Kayaku Co., Ltd.)
*7: Triethylammonium tetraphenylborate (available from Hokkou Chemicals, Inc.)

TABLE 2

| | ex. 1 | ex. 2 | ex. 3 | ex. 4 | ex. 5 | Comp. ex. 1 | Comp. ex. 2 | Comp. ex. 3 | Comp. ex. 4 | Comp. ex. 5 | Comp. ex. 6 | Test Method |
| --- | --- | --- | --- | --- | --- | --- | --- | --- | --- | --- | --- | --- |
| Flexural Strength (kg/mm$^2$) | 15.0 | 15.0 | 15.0 | 14.5 | 15.5 | 15.0 | 15.0 | 15.0 | 14.5 | 14.5 | 16.0 | JIS K 6911 |
| Flexural Modulus (kg/mm$^2$) | 1200 | 1150 | 1200 | 1200 | 1500 | 1250 | 1200 | 1250 | 1250 | 1000 | 1500 | JIS K 6911 |
| Moisture Absorption (wt %) | 0.45 | 0.45 | 0.45 | 0.47 | 0.45 | 0.50 | 0.50 | 0.50 | 0.52 | 0.45 | 0.50 | (1) |
| Thermal Expansion Coef. ($\times 10^{-5}$ °C.$^{-1}$) | 1.5 | 1.5 | 1.5 | 1.5 | 1.6 | 1.5 | 1.5 | 1.5 | 1.5 | 1.8 | 1.8 | TMA Method |
| Glass Transition Point (°C.) | 210 | 205 | 210 | 210 | 210 | 210 | 205 | 210 | 210 | 165 | 200 | TMA Method |
| Alumislide ($\mu$) | 0 | 0 | 0 | 0 | 2 | 0 | 0 | 0 | 0 | 0 | 5 | (2) |
| V.P.S. Test | 0/20 | 0/20 | 0/20 | 0/20 | 0/20 | 8/20 | 5/20 | 8/20 | 10/20 | 20/20 | 15/20 | (3) |

(1): For 24 hours at 121° C. under 2 atms.
(2): Alumislide: Average shift of a bonding pad portion (100 microns × 100 microns) at the four corners of the test element obserbed after repeating, 1000 times, cooling (for 30 minutes at −65° C.) -heating (for 30 minutes at 150° C.) cycles.
(3): V.P.S. Test: The package was held, for 24 hours, in a Pressure-Cooker Tester maintained at 121° C. and 2 atmospheres and immediately thereafter was introduced into a bath of molten solder at 260° C. to count the number of test pieces which caused cracking. The numerator is the number of test pieces causing cracking and the denominator is the total number of the test pieces.

PREPARATION EXAMPLE 3

100 Parts of an epoxy resin represented by the following formula (X) (n=2; epoxy equivalent=165; available from Mitsui Toatsu Chemicals, Inc.):

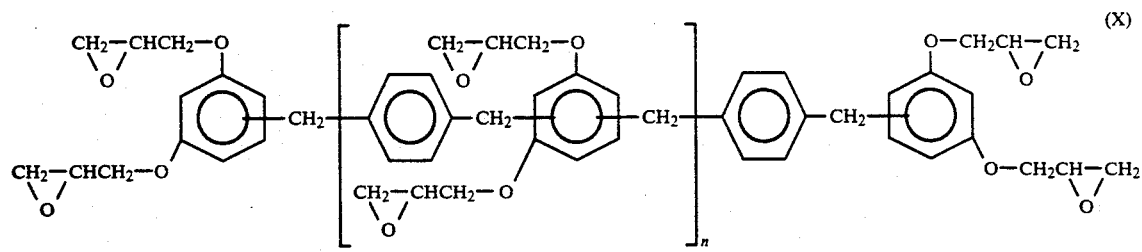

10 parts of toluene and one part of methacrylic acid were reacted at 120° to 125° C. for 2 hours in the presence of tetradecyl dimethyl benzyl ammonium chloride and then 5 parts of butyl acrylate, 10 parts of methacryloxypropylsilicone oligomer (available from Shin-Etsu Chemical Co., Ltd.), 0.4 part of azobisisovaleronitrile and 100 parts of ethyl acetate were added to the reaction product and permitted to react at 75° C. for 4 hours. Further, 15 parts of a vinyl-modified polysiloxane and 15 parts of a hydrogen- modified polysiloxane (both of these being available from Shin-Etsu Chemical Co., Ltd., KE-1204) as addition-reacted silicone polymers were added and reacted for 2 hours with vigorous stirring. Then, the solvent was removed at 130° C. under a reduced pressure to obtain a modified epoxy resin (a-5) (epoxy equivalent=252) in which silicone rubber particles having an average particle size of 0.35 micron were dispersed.

PREPARATION EXAMPLE 4

100 Parts of the epoxy resin used in Preparation Example 3, 10 parts of toluene and 1 part of methacrylic acid were reacted at 120° to 125° C. for 2 hours in the presence of tetradecyl dimethyl benzyl ammonium chloride and then 3.6 parts of butyl acrylate, 0.1 part of glycidyl methacrylate and 0.05 part of t-butylperoxy-2-ethylhexanoate were added to the reaction product and permitted to react at 100 for one hour. Further, the reaction was continued by dropwise adding 30 parts of methacryloxypropylsiloxane, 0.6 part of neopentyl glycol diacrylate and 0.15 part of 1,1-bis(t-butylperoxy)-3,3,5-tricyclohexane for 4 hours and then for an additional 4 hours. Thereafter, the solvent was removed under a reduced pressure to obtain a modified epoxy resin (a-6) (epoxy equivalent=225) in which soft vinyl polymer particles having an average particle size of 0.35 micron were dispersed.

EXAMPLES 6 TO 10 AND COMPARATIVE EXAMPLES 7 TO 12

Resin compositions for molding were prepared by melting and mixing blends having compositions (part by weight) as shown in the following Table 3 for 3 minutes with rollers heated to 110° to 130° C., cooling the melt blend to harden it, pulverizing the hardened blend and compressing the pulverized resin composition.

From these compositions, 100-pin flat packages (20 mm ×30 mm ×2.5 mm) provided thereon with an element (10 mm×10 mm) for testing and test pieces for determining physical properties were formed according to a transfer molding technique (molding conditions: temperature:180° C.; pressure: 70 kg/cm$^2$; and time: 3 minutes) and then were subjected to post-hardening at 180° C. for 6 hours. The results of the tests are summarized in Table 4 given below.

TABLE 3

| Component | ex. 6 | ex. 7 | ex. 8 | ex. 9 | ex. 10 | Comp. ex. 7 | Comp. ex. 8 | Comp. ex. 9 | Comp. ex. 10 | Comp. ex. 11 | Comp. ex. 12 |
|---|---|---|---|---|---|---|---|---|---|---|---|
| Epoxy resin *1 | | | | | 7 | | | | | 5 | |
| Epoxy resin *2 | | | | | | | | | | | 7 |
| Modified epoxy resin (a-5) | 7 | 7 | 7 | | | | | | | 20 | |
| Modified epoxy resin (a-6) | | | | 7 | | | | | | | |
| Modified epoxy resin (a-3) | | | | | | 7 | 7 | 7 | | | |
| Modified epoxy resin (a-4) | | | | | | | | | 7 | | |
| Polymaleimide Compound *3 | 20 | | | 20 | 20 | 20 | | | 20 | | 20 |
| Polymaleimide Compound *4 | | 20 | | | | | 20 | | | | |
| Polymaleimide Compound *5 | | | 20 | | | | | 20 | | | |
| Phenol novolak resin *6 | 3 | 3 | 3 | 3 | 3 | 3 | 3 | 3 | 3 | 5 | 3 |
| Fused silica | 70 | 70 | 70 | 70 | 70 | 70 | 70 | 70 | 70 | 70 | 70 |
| Triphenyl phosphine | 0.25 | 0.25 | 0.25 | 0.25 | 0.25 | 0.25 | 0.25 | 0.25 | 0.25 | 0.25 | 0.25 |
| TEAK *7 | 0.6 | 0.6 | 0.6 | 0.6 | 0.6 | 0.6 | 0.6 | 0.6 | 0.6 | 0.6 | 0.6 |
| Silane coupling agent | 0.6 | 0.6 | 0.6 | 0.6 | 0.6 | 0.6 | 0.6 | 0.6 | 0.6 | 0.6 | 0.6 |
| Carnauba wax | 0.45 | 0.45 | 0.45 | 0.45 | 0.45 | 0.45 | 0.45 | 0.45 | 0.45 | 0.45 | 0.45 |
| Carbon black | 0.3 | 0.3 | 0.3 | 0.3 | 0.3 | 0.3 | 0.3 | 0.3 | 0.3 | 0.3 | 0.3 |
| Antimony Oxide | 1.5 | 1.5 | 1.5 | 1.5 | 1.5 | 1.5 | 1.5 | 1.5 | 1.5 | 1.5 | 1.5 |

*1: The epoxy resin represented by the foregoing formula (X)
*2: o-Cresol-novolak epoxy resin (EOCN 1020, available from Nippon Kayaku Co., Ltd.)
*3: 4,4'-Bis(3-maleimidephenoxy)biphenyl (available from Mitsui Toatsu Chemicals, Inc.)
*4: Bis[4-(3-maleimidephenoxy)phenyl]sulfide (available from Mitsui Toatsu Chemicals, Inc.)
*5: Polymaleimide compound having n in the foregoing general formula (VIII) of 3.0 on the average (available from Mitsui Toatsu Chemicals, Inc.)
*6: Phenol-novolak (PN, available from Nippon Kayaku Co., Ltd.)
*7: Triethylammonium tetraphenylborate (available from Hokkou Chemicals, Inc.)

TABLE 4

| | ex. 6 | ex. 7 | ex. 8 | ex. 9 | ex. 10 | Comp. ex. 7 | Comp. ex. 8 | Comp. ex. 9 | Comp. ex. 10 | Comp. ex. 11 | Comp. ex. 12 | Test Method |
|---|---|---|---|---|---|---|---|---|---|---|---|---|
| Flexural Strength | 15.0 | 15.0 | 15.0 | 14.0 | 15.0 | 15.0 | 15.0 | 15.0 | 14.5 | 14.5 | 16.0 | JIS K 6911 |

TABLE 4-continued

| | ex. 6 | ex. 7 | ex. 8 | ex. 9 | ex. 10 | Comp. ex. 7 | Comp. ex. 8 | Comp. ex. 9 | Comp. ex. 10 | Comp. ex. 11 | Comp. ex. 12 | Test Method |
|---|---|---|---|---|---|---|---|---|---|---|---|---|
| (kg/mm²) | | | | | | | | | | | | |
| Flexural Modulus (kg/mm²) | 1200 | 1150 | 1200 | 1200 | 1500 | 1250 | 1200 | 1250 | 1250 | 1000 | 1500 | JIS K 6911 |
| Thermal Expansion Coef. ($\times 10^{-5}\,°C.^{-1}$) | 1.5 | 1.5 | 1.5 | 1.5 | 1.6 | 1.5 | 1.5 | 1.5 | 1.5 | 1.8 | 1.8 | TMA Method |
| Glass Transition Point (°C.) | 215 | 210 | 215 | 215 | 215 | 210 | 205 | 210 | 210 | 180 | 200 | TMA Method |
| Alumislide (μ) | 0 | 0 | 0 | 0 | 2 | 0 | 0 | 0 | 0 | 0 | 5 | (1) |
| V.P.S. Test | 0/20 | 0/20 | 0/20 | 0/20 | 0/20 | 8/20 | 5/20 | 8/20 | 10/20 | 20/20 | 15/20 | (2) |

(1): Alumislide: Average shift of a bonding pad portion (100 microns × 100 microns) at the four corners of the test element obserbed after repeating, 1000 times, cooling (for 30 minutes at −65° C.) -heating (for 30 minutes at 150° C.) cycles.

(2): V.P.S. Test: The package was held, for 24 hours, in a Pressure-Cooker Tester maintained at 121° C. and 2 atmospheres and immediately thereafter was introduced into a bath of molten solder at 260° C. to count the number of test pieces which caused cracking. The numerator is the number of test pieces causing cracking and the denominator is the total number of the test pieces.

PREPARATION EXAMPLE 5

100 Parts of an epoxy resin represented by the following formula (XI) (n=1.0; epoxy equivalent=167; available from Mitsui Toatsu Chemicals. Inc.):

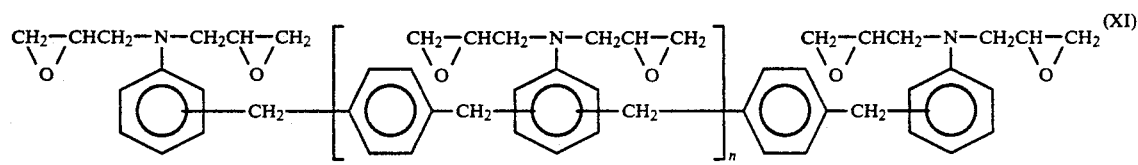

10 parts of toluene and one part of methacrylic acid were reacted at 120° to 125° C. for 2 hours in the presence of tetradecyl dimethyl benzyl ammonium chloride and then 5 parts of butyl acrylate, 10 parts of methacryloxypropylsilicone oligomer (available from Shin-Etsu Chemical Co., Ltd.), 0.4 part of azobisisovaleronitrile and 100 parts of ethyl acetate were added to the reaction product and permitted to react at 75° C. for 4 hours. Further, 15 parts of a vinyl-modified polysiloxane and 15 parts of a hydrogen-modified polysiloxane (both of these being available from Shin-Etsu Chemical Co., Ltd., KE-1204) as addition-reacted silicone polymers were added and reacted for 2 hours with vigorous stirring. Then, the solvent was removed at 130° C. under a reduced pressure to obtain a modified epoxy resin (a-7) (epoxy equivalent=254) in which silicone rubber particles having an average particle size of 0.35 micron were dispersed.

PREPARATION EXAMPLE 6

100 Parts of the epoxy resin used in Preparation Example 3, 10 parts of toluene and 1 part of methacrylic acid were reacted at 120° to 125° C. for 2 hours in the presence of tetradecyl dimethyl benzyl ammonium chloride and then 3.6 parts of butyl acrylate, 0.1 part of glycidyl methacrylate and 0.05 part of t-butylperoxy-2-ethylhexanoate were added to the reaction product and permitted to react at 100° C. for one hour. Further, the reaction was continued by dropwise adding 30 parts of methacryloxypropylsiloxane, 0.6 part of neopentyl glycol diacrylate and 0.15 part of 1,1-bis(t-butylperoxy)-3,3,5-tricyclohexane for 4 hours and then for an additional 4 hours. Thereafter, the solvent was removed under a reduced pressure to obtain a modified epoxy resin (a-8) (epoxy equivalent=236) in which soft vinyl polymer particles having an average particle size of 0.35 micron were dispersed.

EXAMPLES 11 TO 15 AND COMPARATIVE EXAMPLES 13 TO 18

Resin compositions for molding were prepared by melting and mixing blends having compositions (part by weight) as shown in the following Table 5 for 5 minutes with rollers heated to 110° to 130° C. cooling the melt blend to harden it, pulverizing the hardened blend and compressing the pulverized resin composition.

From these compositions, 100-pin flat packages (20 mm ×30 mm×2.5 mm) provided thereon with an element (10 mm×10 mm) for testing and test pieces for determining physical properties were formed according to a transfer molding technique (molding conditions: temperature:180° C.; pressure: 70 kg/cm²; and time: 3 minutes) and then were subjected to post-hardening at 180° C. for 6 hours. The results of the tests are summarized in Table 6 given below.

TABLE 5

| Component | ex. 11 | ex. 12 | ex. 13 | ex. 14 | ex. 15 | Comp. ex. 13 | Comp. ex. 14 | Comp. ex. 15 | Comp. ex. 16 | Comp. ex. 17 | Comp. ex. 18 |
|---|---|---|---|---|---|---|---|---|---|---|---|
| Epoxy resin *1 | | | | | 7 | | | | | 5 | |
| Epoxy resin *2 | | | | | | | | | | | 7 |
| Modified epoxy resin (a-7) | 7 | 7 | 7 | | | | | | | 20 | |
| Modified epoxy resin (a-8) | | | | 7 | | | | | | | |
| Modified epoxy resin (a-3) | | | | | | 7 | 7 | 7 | | | |
| Modified epoxy resin (a-4) | | | | | | | | | 7 | | |
| Polymaleimide Compound *3 | 20 | | | 20 | 20 | 20 | | | 20 | | 20 |
| Polymaleimide Compound *4 | | 20 | | | | | 20 | | | | |
| Polymaleimide Compound *5 | | | 20 | | | | | 20 | | | |
| Phenol novolak resin *6 | 3 | 3 | 3 | 3 | 3 | 3 | 3 | 3 | 3 | 5 | 3 |
| Fused silica | 70 | 70 | 70 | 70 | 70 | 70 | 70 | 70 | 70 | 70 | 70 |

TABLE 5-continued

| Component | ex. 11 | ex. 12 | ex. 13 | ex. 14 | ex. 15 | Comp. ex. 13 | Comp. ex. 14 | Comp. ex. 15 | Comp. ex. 16 | Comp. ex. 17 | Comp. ex. 18 |
|---|---|---|---|---|---|---|---|---|---|---|---|
| Triphenyl phosphine | 0.25 | 0.25 | 0.25 | 0.25 | 0.25 | 0.25 | 0.25 | 0.25 | 0.25 | 0.25 | 0.25 |
| TEAK *7 | 0.6 | 0.6 | 0.6 | 0.6 | 0.6 | 0.6 | 0.6 | 0.6 | 0.6 | 0.6 | 0.6 |
| Silane coupling agent | 0.6 | 0.6 | 0.6 | 0.6 | 0.6 | 0.6 | 0.6 | 0.6 | 0.6 | 0.6 | 0.6 |
| Carnauba wax | 0.45 | 0.45 | 0.45 | 0.45 | 0.45 | 0.45 | 0.45 | 0.45 | 0.45 | 0.45 | 0.45 |
| Carbon black | 0.3 | 0.3 | 0.3 | 0.3 | 0.3 | 0.3 | 0.3 | 0.3 | 0.3 | 0.3 | 0.3 |
| Antimony Oxide | 1.5 | 1.5 | 1.5 | 1.5 | 1.5 | 1.5 | 1.5 | 1.5 | 1.5 | 1.5 | 1.5 |

*1: The epoxy resin represented by the foregoing formula (XI)
*2: o-Cresol-novolak epoxy resin (EOCN 1020, available from Nippon Kayaku Co., Ltd.)
*3: 4,4'-Bis(3-maleimidephenoxy)biphenyl (available from Mitsui Toatsu Chemicals, Inc.)
*4: Bis[4-(3-maleimidephenoxy)phenyl]sulfide (available from Mitsui Toatsu Chemicals, Inc.)
*5: Polymaleimide compound having n in the foregoing general formula (VIII) of 3.0 on the average (available from Mitsui Toatsu Chemicals, Inc.)
*6: Phenol-novolak (PN, available from Nippon Kayaku Co., Ltd.)
*7: Triethylammonium tetraphenylborate (available from Hokkou Chemicals, Inc.)

TABLE 6

| | ex. 11 | ex. 12 | ex. 13 | ex. 14 | ex. 15 | Comp. ex. 13 | Comp. ex. 14 | Comp. ex. 15 | Comp. ex. 16 | Comp. ex. 17 | Comp. ex. 18 | Test Method |
|---|---|---|---|---|---|---|---|---|---|---|---|---|
| Flexural Strength ($kg/mm^2$) | 15.0 | 15.0 | 15.0 | 14.5 | 15.5 | 15.0 | 15.0 | 15.0 | 14.5 | 14.5 | 16.0 | JIS K 6911 |
| Flexural Modulus ($kg/mm^2$) | 1200 | 1150 | 1200 | 1200 | 1500 | 1250 | 1200 | 1250 | 1250 | 1000 | 1500 | JIS K 6911 |
| Thermal Expansion Coef. ($\times 10^{-5}\,°C.^{-1}$) | 1.5 | 1.5 | 1.5 | 1.5 | 1.6 | 1.5 | 1.5 | 1.5 | 1.5 | 1.8 | 1.8 | TMA Method |
| Glass Transition Point (°C.) | 215 | 210 | 215 | 215 | 215 | 210 | 205 | 210 | 210 | 180 | 200 | TMA Method |
| Alumislide ($\mu$) | 0 | 0 | 0 | 0 | 2 | 0 | 0 | 0 | 0 | 0 | 5 | (1) |
| V.P.S. Test | 0/20 | 0/20 | 0/20 | 0/20 | 0/20 | 8/20 | 5/20 | 8/20 | 10/20 | 20/20 | 15/20 | (2) |

(1): Alumislide: Average shift of a bonding pad portion (100 microns × 100 microns) at the four corners of the test element obserbed after repeating, 1000 times, cooling (for 30 minutes at −65° C.) -heating (for 30 minutes at 150° C.) cycles.
(2): V.P.S. Test: The package was held, for 24 hours, in a Pressure-Cooker Tester maintained at 121° C. and 2 atmospheres and immediately thereafter was introduced into a bath of molten solder at 260° C. to count the number of test pieces which caused cracking. The numerator is the number of test pieces causing cracking and the denominator is the total number of the test pieces.

PREPARATION EXAMPLE 7

100 Parts of an imido ring-containing epoxy resin represented by the following formula (XII)

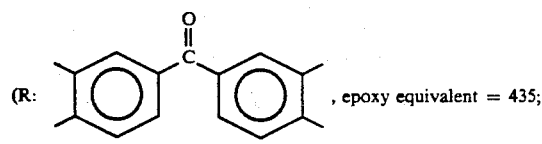

(R: , epoxy equivalent = 435;

available from Mitsui Toatsu Chemicals, Inc.):

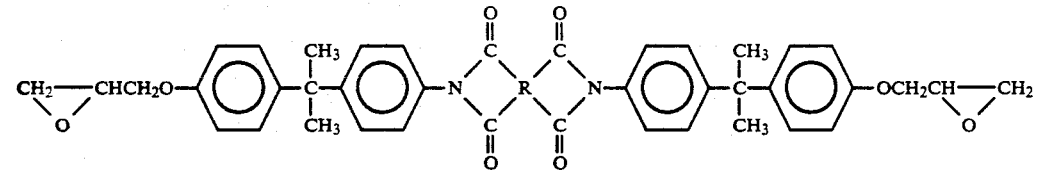

10 parts of toluene and one part of methacrylic acid were reacted at 120° to 125° C. for 2 hours in the presence of tetradecyl dimethyl benzyl ammonium chloride and then 5 parts of butyl acrylate, 10 parts of methacryloxypropylsilicone oligomer (available from Shin-Etsu Chemical Co., Ltd.), 0.4 part of azobisisovaleronitrile and 100 parts of ethyl acetate were added to the reaction product and permitted to react at 75° for 4 hours. Further, 15 parts of a vinyl-modified polysiloxane and 15 parts of a hydrogen-modified polysiloxane (both of these being available from Shin-Etsu Chemical Co., Ltd.; KE-1204) as addition-reacted silicone polymers were added and reacted for 2 hours with vigorous stirring. Then, the solvent was removed at 130° C. under a reduced pressure to obtain a modified epoxy resin (a-9) (epoxy equivalent=635) in which silicone rubber particles having an average particle size of 0.35 micron were dispersed.

PREPARATION EXAMPLE 8

100 Parts of the epoxy resin used in Preparation Example 5, 10 parts of toluene and 1 part of methacrylic acid were reacted at 120° to 125° C. for 2 hours in the presence of tetradecyl dimethyl benzyl ammonium chloride and then 3.6 parts of butyl acrylate, 0.1 part of glycidyl methacrylate and 0.05 part of t-butylperoxy-2-ethylhexanoate were added to the reaction product and permitted to react at 100 for one hour. Further, the reaction was continued by dropwise adding 30 parts of methacryl- oxypropylsiloxane, 0.6 part of neopentyl glycol diacrylate and 0.15 part of 1,1-bis(t-butylperoxy)-3,3,5-tricyclohexane for 4 hours and then for an additional 4 hours. Thereafter, the solvent was removed under a reduced pressure to obtain a modified epoxy resin (a-10) (epoxy equivalent=590) in which soft vinyl polymer particles having an average particle size of 0.35 micron were dispersed.

EXAMPLES 16 TO 20 AND COMPARATIVE EXAMPLES 19 TO 24

Resin compositions for molding were prepared by melting and mixing blends having compositions (part by weight) as shown in the following Table 7 for 3 minutes with rollers heated to 110° to 130° C. cooling the melt blend to harden it, pulverizing the hardened blend and compressing the pulverized resin composition.

From these compositions, 100-pin flat packages (20 mm × 30 mm × 2.5 mm) provided thereon with an element (10 mm × 10 mm) for testing and test pieces for determining physical properties were formed according to a transfer molding technique (molding conditions: temperature: 180° C.; pressure: 70 kg/cm²; time: 3 minutes) and then were subjected to post-hardening at 180° C. for 6 hours. The results of the tests are summarized in Table 8 given below.

ability. Thus, the present invention is highly industrially useful.

What is claimed is:

1. A resin composition for sealing semiconductors which comprises components,
   (a) an epoxy resin represented by the following general formula (I):

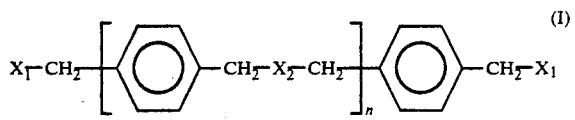

wherein $X_1$ represents

TABLE 7

| Component | ex. 16 | ex. 17 | ex. 18 | ex. 19 | ex. 20 | Comp. ex. 19 | Comp. ex. 20 | Comp. ex. 21 | Comp. ex. 22 | Comp. ex. 23 | Comp. ex. 24 |
|---|---|---|---|---|---|---|---|---|---|---|---|
| Epoxy resin *1 | | | | | 7 | | | | | 5 | |
| Epoxy resin *2 | | | | | | | | | | | 7 |
| Modified epoxy resin (a-9) | 7 | 7 | 7 | | | | | | | 20 | |
| Modified epoxy resin (a-10) | | | | 7 | | | | | | | |
| Modified epoxy resin (a-3) | | | | | | 7 | 7 | 7 | | | |
| Modified epoxy resin (a-4) | | | | | | | | | 7 | | |
| Polymaleimide Compound *3 | 20 | | | 20 | 20 | 20 | | | | 20 | 20 |
| Polymaleimide Compound *4 | | 20 | | | | | 20 | | | | |
| Polymaleimide Compound *5 | | | 20 | | | | | 20 | | | |
| Phenol novolak resin *6 | 3 | 3 | 3 | 3 | 3 | 3 | 3 | 3 | 3 | 5 | 3 |
| Fused silica | 70 | 70 | 70 | 70 | 70 | 70 | 70 | 70 | 70 | 70 | 70 |
| Triphenyl phosphine | 0.25 | 0.25 | 0.25 | 0.25 | 0.25 | 0.25 | 0.25 | 0.25 | 0.25 | 0.25 | 0.25 |
| TEAK *7 | 0.6 | 0.6 | 0.6 | 0.6 | 0.6 | 0.6 | 0.6 | 0.6 | 0.6 | 0.6 | 0.6 |
| Silane coupling agent | 0.6 | 0.6 | 0.6 | 0.6 | 0.6 | 0.6 | 0.6 | 0.6 | 0.6 | 0.6 | 0.6 |
| Carnauba wax | 0.45 | 0.45 | 0.45 | 0.45 | 0.45 | 0.45 | 0.45 | 0.45 | 0.45 | 0.45 | 0.45 |
| Carbon black | 0.3 | 0.3 | 0.3 | 0.3 | 0.3 | 0.3 | 0.3 | 0.3 | 0.3 | 0.3 | 0.3 |
| Antimony Oxide | 1.5 | 1.5 | 1.5 | 1.5 | 1.5 | 1.5 | 1.5 | 1.5 | 1.5 | 1.5 | 1.5 |

*1: The epoxy resin represented by the foregoing formula (XII).
*2: o-Cresol-novolak epoxy resin (EOCN 1020, available from Nippon Kayaku Co., Ltd.)
*3: 4,4'-Bis(3-maleimidephenoxy)biphenyl (available from Mitsui Toatsu Chemicals, Inc.)
*4: Bis[4-(3-maleimidephenoxy)phenyl]sulfide (available from Mitsui Toatsu Chemicals, Inc.)
*5: Polymaleimide compound having n in the foregoing general formula (VIII) of 3.0 on the average (available from Mitsui Toatsu Chemicals, Inc.)
*6: Phenol-novolak (PN, available from Nippon Kayaku Co., Ltd.)
*7: Triethylammonium tetraphenylborate (available from Hokkou Chemicals, Inc.)

TABLE 8

| | ex. 16 | ex. 17 | ex. 18 | ex. 19 | ex. 20 | Comp. ex. 19 | Comp. ex. 20 | Comp. ex. 21 | Comp. ex. 22 | Comp. ex. 23 | Comp. ex. 24 | Test Method |
|---|---|---|---|---|---|---|---|---|---|---|---|---|
| Flexural Strength (kg/mm²) | 15.0 | 15.0 | 15.0 | 14.5 | 15.5 | 15.0 | 15.0 | 15.0 | 14.5 | 14.5 | 16.0 | JIS K 6911 |
| Flexural Modulus (kg/mm²) | 1200 | 1150 | 1200 | 1200 | 1500 | 1250 | 1200 | 1250 | 1250 | 1000 | 1500 | JIS K 6911 |
| Thermal Expansion Coef. ($\times 10^{-5}$ °C.$^{-1}$) | 1.5 | 1.5 | 1.5 | 1.5 | 1.6 | 1.5 | 1.5 | 1.5 | 1.5 | 1.8 | 1.8 | TMA Method |
| Glass Transition Point (°C.) | 210 | 210 | 210 | 210 | 210 | 210 | 210 | 210 | 210 | 170 | 200 | TMA Method |
| Alumislide (μ) | 0 | 0 | 0 | 0 | 2 | 0 | 0 | 0 | 0 | 0 | 5 | (1) |
| V.P.S. Test | 0/20 | 0/20 | 0/20 | 0/20 | 0/20 | 8/20 | 5/20 | 8/20 | 10/20 | 20/20 | 15/20 | (2) |

(1): Alumislide: Average shift of a bonding pad portion (100 microns × 100 microns) at the four corners of the test element obserbed after repeating. 1000 times, cooling (for 30 minutes at −65° C.) -heating (for 30 minutes at 150° C.) cycles.
(2): V.P.S. Test: The package was held, for 24 hours, in a Pressure-Cooker Tester maintained at 121° C. and 2 atmospheres and immediately thereafter was introduced into a bath of molten solder at 260° C. to count the number of test pieces which caused cracking. The numerator is the number of test pieces causing cracking and the denominator is the total number of the test pieces.

As has been explained above with reference to Examples and Comparative Examples, the resin composition for sealing semiconductors according to the present invention generates low stress and exhibits high heat resistance during soldering even after moisture absorption. Therefore, if the composition is used to seal large-scale semiconductor devices having high degree of integration or small-sized, thin semiconductors such as flat packages, these semiconductors provide high reliability.

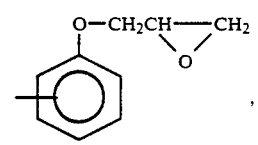

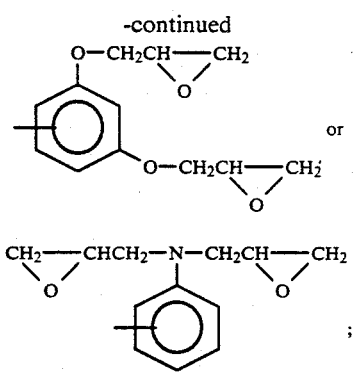

X₂ represents

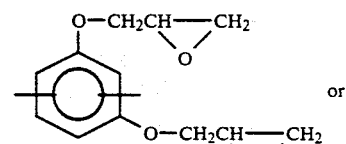

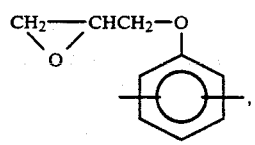

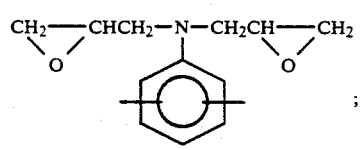

and n is an average ranging from 0 to 10;
(b) a hardening agent;
(c) an inorganic filler; and
(d) a polymaleimide represented by the following general formula (III):

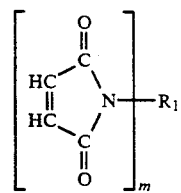

(wherein R₁ represents an m-valent organic group having at least two carbon atoms and m is an integer of not less than 2).

2. The resin composition for sealing semiconductors of claim 1 wherein the epoxy resin represented by the general formula (I) is an epoxy resin represented by the general formula:

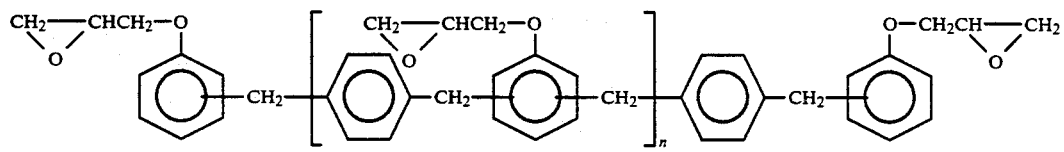

wherein n is an average ranging from 0 to 10.

3. The resin composition for sealing semiconductors of claim 1 wherein the epoxy resin represented by the general formula (I) is an epoxy resin represented by the general formula:

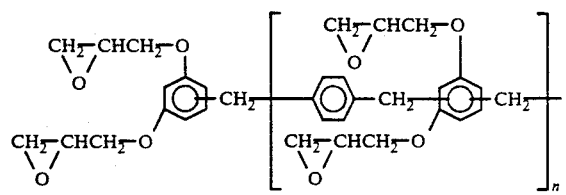

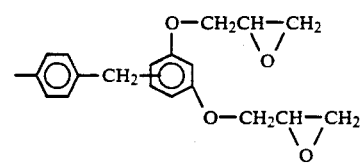

wherein n is an average ranging from 0 to 10.

4. The resin composition for sealing semiconductors for claim 1 wherein the epoxy resin represented by the general formula (I) is an epoxy resin represented by the general formula:

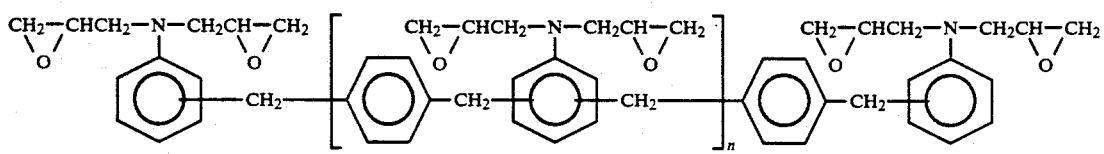

wherein n is an average ranging from 0 to 10.

5. The resin composition for sealing semiconductors of claim 1 wherein the polymaleimide is a bismaleimide compound represented by the following general formula:

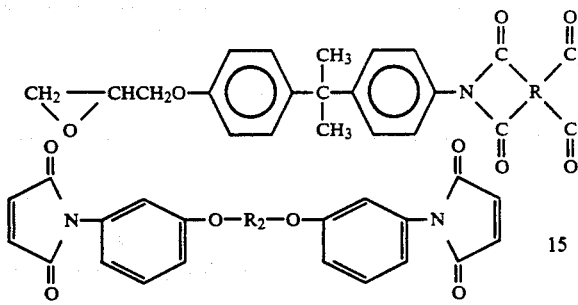

wherein R₂ represents

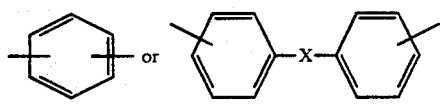

wherein X represents a direct bond, a bivalent hydrocarbon group having 1 to 10 carbon atoms, a hexafluorinated isopropylidene group, a carbonyl group, a thio group, a sulfinyl group, a sulfonyl group or an oxide.

6. The resin composition for sealing semiconductors as set forth in claim 1 wherein the polymaleimide is a member selected from those represented by the following general formula:

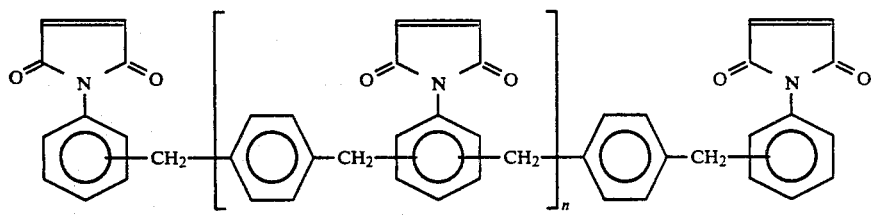

wherein n is an average number of the units enclosed in brackets ranging from 0 to 10.

7. The resin composition for sealing semiconductors of claim 1 wherein the polymaleimide is 4,4'-bis(3-maleimidephenoxy)biphenyl.

8. The resin composition for sealing semiconductors of claim 1 wherein the polymaleimdie is bis[4-(3-maleimidephenoxy)phenyl]sulfide.

9. The resin composition for sealing semiconductors of claim 1 wherein the hardening agent is novolak phenol resin and/or phenol aralkyl resin.

10. The resin composition for sealing semiconductors of claim 1 wherein the amount of the hardening agent ranges from 0.1 to 10 expressed in equivalent weight ratio based on the epoxy resin.

11. The resin composition for sealing semiconductors of claim 1 wherein the inorganic filler is crystalline and/or fused silica.

12. The resin composition for sealing semiconductors of claim 1 wherein the amount of the inorganic filler ranges from 100 to 800 parts by weight per 100 parts by weight of the sum of the epoxy resin, the hardening agent and the polymaleimide.

13. A resin composition for sealing semiconductors which comprises components,
(a) an epoxy resin represented by the following general formula (II):

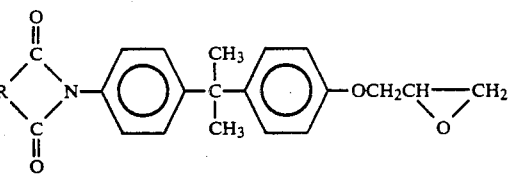

(in the formula (II), R represents a tetravalent group selected from the group consisting of aliphatic groups having at least two carbon atoms, alicyclic groups, monocyclic aromatic groups, condensed polycyclic aromatic groups and non-condensed polycyclic aromatic groups formed by connecting aromatic groups directly or through a divalent group);
(b) a hardening agent;
(c) an inorganic filler: and
(d) a polymaleimide represented by the following general formula (III):

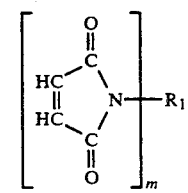

(wherein R₁ represents an m-valent organic group having at least two carbon atoms and m is an integer of not less than 2).

14. The resin composition for sealing semiconductors of claim 13 wherein the polymaleimide is a bismaleimide compound represented by the following general formula:

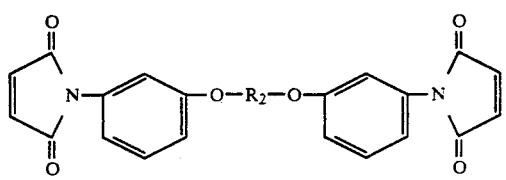

wherein R₂ represents

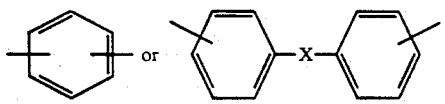

wherein X represents a direct bond, a bivalent hydrocarbon group having 1 to 10 carbon atoms, a hexafluorinated isopropylidene group, a carbonyl group, a thio group, a sulfinyl group, a sulfonyl group or an oxide.

15. The resin composition for sealing semiconductors of claim 13 wherein the polymaleimide is a member selected from those represented by the following general formula:

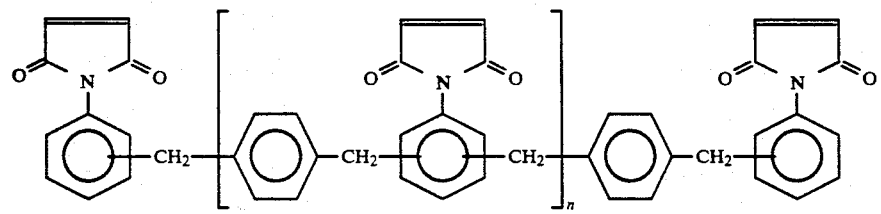

wherein n is an average number of the units enclosed in brackets ranging from 0 to 10.

16. The resin composition for sealing semiconductors of claim 13 wherein the polymaleimide is 4,4'-bis(3-maleimidephenoxy)biphenyl.

17. The resin composition for sealing semiconductors of claim 13 wherein the polymaleimide is bis[4-(3-maleimidephenoxy)phenyl]sulfide.

18. The resin composition for sealing semiconductors of claim 13 wherein the hardening agent is novolak phenol resin and/or phenol aralkyl resin.

19. The resin composition for sealing semiconductors of claim 13 wherein the amount of the hardening agent ranges from 0.1 to 10 expressed in equivalent weight ratio based on the epoxy resin.

20. The resin composition for sealing semiconductors of claim 13 wherein the inorganic filler is crystalline and/or fused silica.

21. The resin composition for sealing semiconductors of claim 13 wherein the amount of the inorganic filler ranges from 100 to 800 parts by weight per 100 parts by weight of the sum of the epoxy resin, the hardening agent and the polymaleimide.

22. A resin composition for sealing semiconductors which comprises components,
(a) an epoxy resin represented by the following general formula (II):

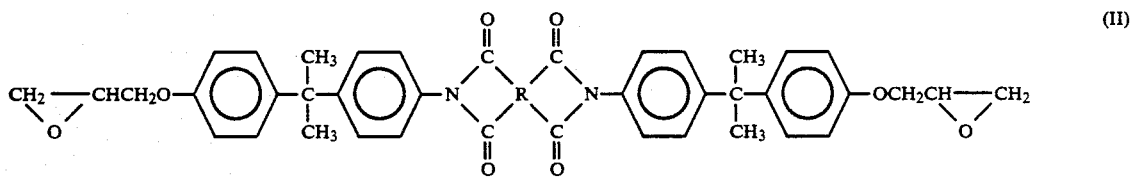

(in the formula (II), R represents a tetravalent group selected from the group consisting of aliphatic groups having at least two carbon atoms, alicyclic groups, monocyclic aromatic groups, condensed polycyclic aromatic groups and non-condensed polycyclic aromatic groups formed by connecting aromatic groups directly or through a divalent group);
(b) a novolak phenol resin hardening agent
(c) an inorganic filler; and
(d) a bismaleimide compound represented by the following general formula:

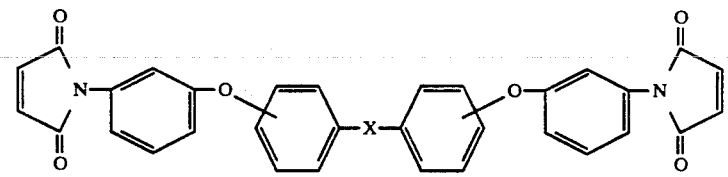

wherein X represents a direct bond, a bivalent hydrocarbon group having 1 to 10 carbon atoms, a hexafluorinated isopropylidene group, a carbonyl group, a thio group, a sulfinyl group, a sulfonyl group or an oxide.

* * * * *